(12) United States Patent
Kiehm

(10) Patent No.: US 6,644,179 B1
(45) Date of Patent: Nov. 11, 2003

(54) MEASURED UTILITY KITCHEN TOOL

(76) Inventor: Rutherford Kiehm, 46-261 Kahuhipa St., A-211, Kaneohe, HI (US) 96744

( * ) Notice: Subject to any disclaimer, the term of this patent is extended or adjusted under 35 U.S.C. 154(b) by 0 days.

(21) Appl. No.: 10/394,899

(22) Filed: Mar. 22, 2003

(51) Int. Cl.$^7$ ............................. A23L 1/00; A47J 19/06; A47J 43/14; A47J 19/02; A23P 1/00
(52) U.S. Cl. ........................ 99/510; 99/568; 99/484; 83/356.3; 83/932; 241/91; 241/169; 425/282; 425/284
(58) Field of Search ..................... 99/495, 509–511, 99/484, 568–581; 425/282–286, 516; 294/118, 16, 93, 902; 83/666, 355, 356.3, 932; 241/168–169.2, 282.1, 282.2, 92, 93, 272; 30/120.1–120.5

(56) References Cited

U.S. PATENT DOCUMENTS

| | | | |
|---|---|---|---|
| 979,364 A | * 12/1910 | Baudement et al. | 241/91 X |
| 1,488,276 A | * 3/1924 | O'Brien | 241/91 X |
| 1,561,558 A | 11/1925 | Manos | |
| 1,877,935 A | 9/1932 | Millo | |
| 2,906,195 A | * 9/1959 | Zysset | 99/510 X |
| 4,117,980 A | * 10/1978 | Hartmann | 241/282.2 |
| 4,191,517 A | 3/1980 | Byrd | |
| 4,192,470 A | * 3/1980 | Hartmann | 241/169 |
| 4,582,265 A | * 4/1986 | Petronelli | 99/495 X |
| 4,721,449 A | 1/1988 | Alberts | |
| 4,859,168 A | 8/1989 | Calder | |
| 5,000,672 A | * 3/1991 | Halimi | 425/279 |
| 5,490,454 A | * 2/1996 | Ancona et al. | 99/510 |
| 5,513,810 A | * 5/1996 | Lin | 99/495 X |
| 5,660,341 A | * 8/1997 | Perkins et al. | 99/510 X |
| 5,791,237 A | * 8/1998 | Gibson | 99/510 |
| 6,162,039 A | 12/2000 | Schwarz | |
| 6,238,718 B1 | 5/2001 | Schwarz | |
| 6,435,080 B1 | * 8/2002 | Zariengo | 99/510 |
| 6,467,711 B2 | * 10/2002 | Michel | 241/169 |

* cited by examiner

Primary Examiner—Timothy F. Simone
(74) Attorney, Agent, or Firm—Randal D. Homburg

(57) ABSTRACT

The utility kitchen tool is a multiple task tool used in the kitchen utilizing the force of a spring-loaded scissor action handle applied to a push plate mounted within an attaching interchangeable scoop or container allowing for the scoop to create formed measured amounts of dispensable foods, to prepare food for cooking, to slice food, chop foods or to create molded measured amounts of soft foods for baking or serving in a plurality of ornamental shapes. The scoop also provides either a straight forcing motion of the push plate or a spinning motion of the push plate depending on the present use of the scoop and also provides a attaching container to hold foods being chopped or minced.

4 Claims, 3 Drawing Sheets

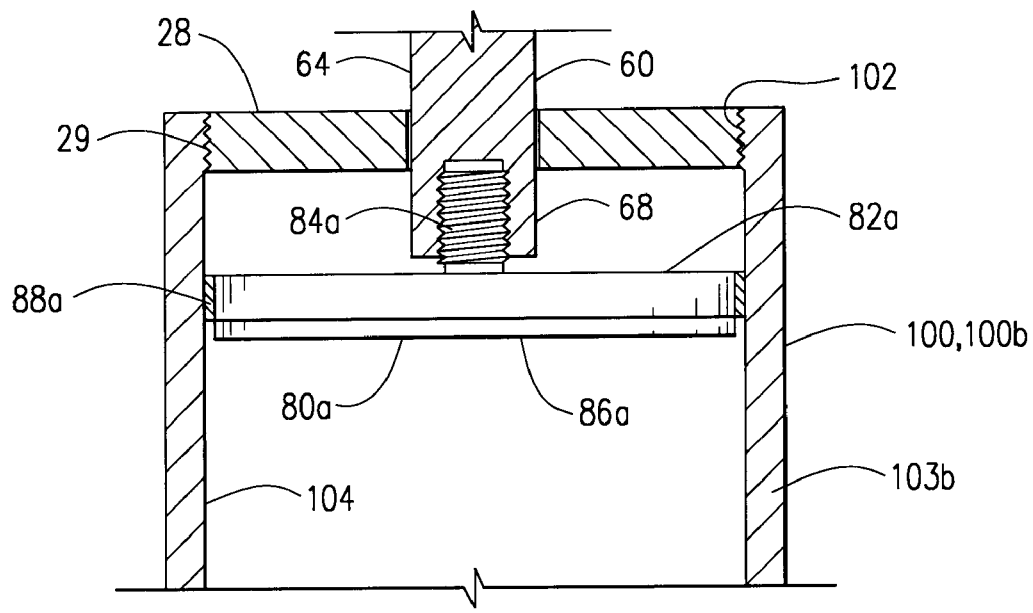
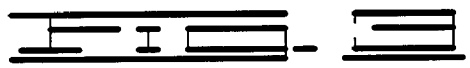
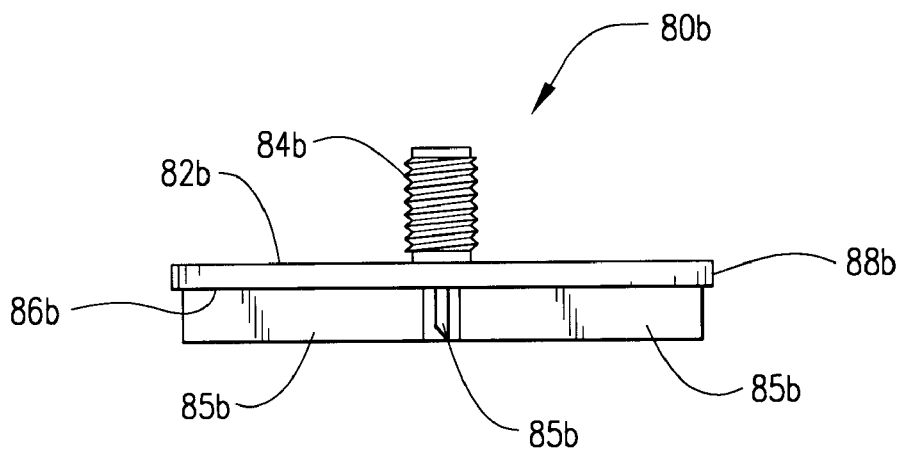
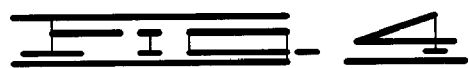

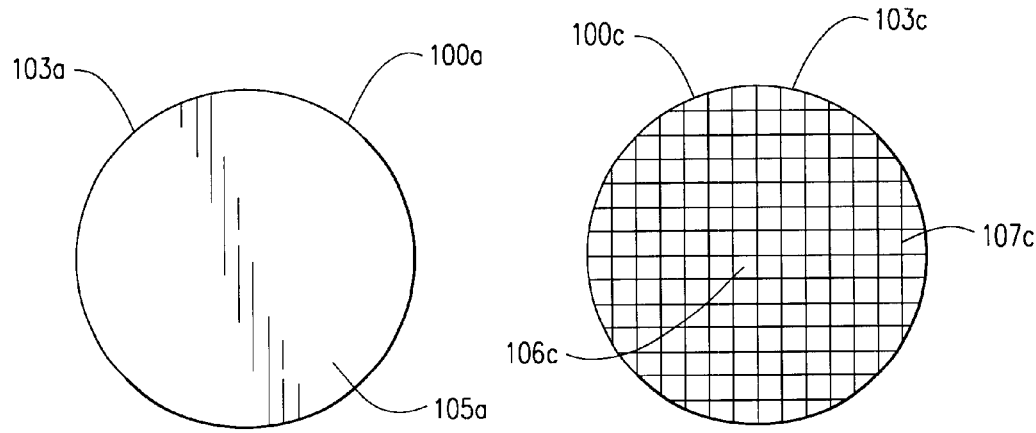
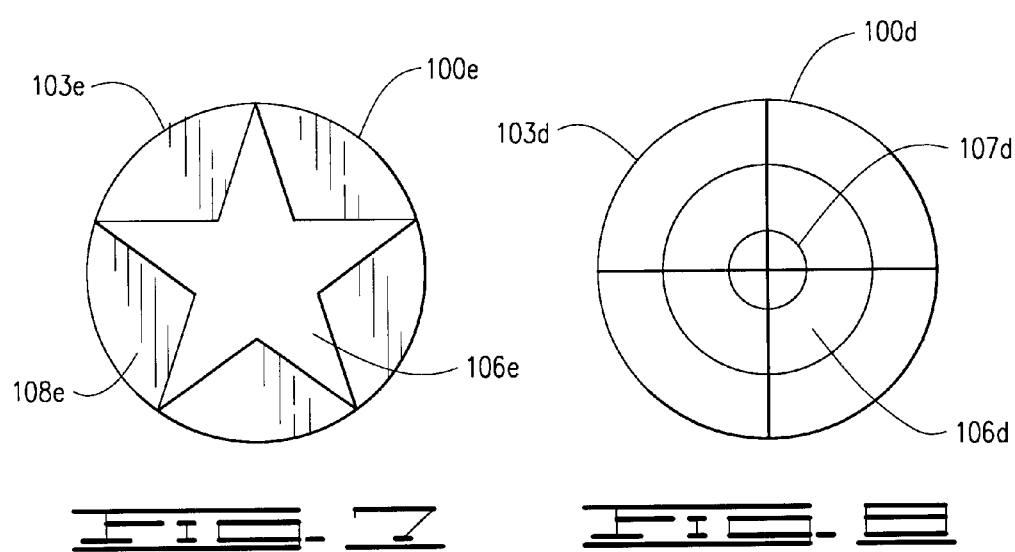

US 6,644,179 B1

MEASURED UTILITY KITCHEN TOOL

I. BACKGROUND OF THE INVENTION

1. Field of Invention

The utility kitchen tool is a multiple task tool used in the kitchen utilizing the force of a spring-loaded scissor action handle applied to a push plate mounted within an attaching interchangeable scoop or container allowing for the scoop to create formed measured amounts of dispensable foods, to prepare food for cooking, to slice food, chop foods or to create molded measured amounts of soft foods for baking or serving in a plurality of ornamental shapes. The scoop also provides either a straight forcing motion of the push plate or a spinning motion of the push plate depending on the present use of the scoop and also provides a attaching container to hold foods being chopped or minced.

2. Description of Prior Art

The following United States patents were discovered and are disclosed within this application for utility patent. All relate to kitchen scissors and food preparation devices. Three prior patents involve common ice cream scoops that include an ice cream scoop with an ejection means to remove the ice cream from the scoop, those patents listed as U.S. Pat. No. 4,721,449 to Alberts, U.S Pat. No. 4,191,517 to Byrd and U.S No. 1,877,935 to Millo.

Several other patents disclose combination food shaping items and ejectors. In U.S. Pat. No. 4,859,168 to Calder, a spherical or disk shaped product can be scooped and dispensed by the apparatus disclosed. However, the apparatus does not have interconnecting and interchangeable components that allow for the various food preparation means disclosed in the current invention. Likewise, such food preparation components are not disclosed in U.S. Pat. No. 1,561,558 to Manos, dispensing heart shaped items, or in either of the Schwartz patents, disclosed in U.S. Pat. Nos. 6,238,718 and 6,162,039, which simply allow for scooping into the shaped container and ejection using a direct lever action mechanism, primarily oriented for thumb depression. None of the disclosed invention include interchangeable push plates, the ability to dismantle the components for cleaning, nor the variety of interchangeable and removable ring attachments for mincing, slicing, coring, scooping measured portions or crushing nuts included in the utility tool of the present invention.

II. SUMMARY OF THE INVENTION

The primary objective of the invention is to provide a single hand usable kitchen device adapted through multiple interchanging accessories to prepare various foods for cooking and also to provide a scoop to dispense measured amounts of dispensable foods. A second objective of the invention is to provide multiple attaching accessories to adapt the scoop to be used to chop, mince, slice or crush foods for cooking use. A third objective of the invention is to provide the scoop to dispense measured amounts of scooped food product in a variety of aesthetic shapes for baking or for serving as shaped food items.

III. DESCRIPTION OF THE DRAWINGS

The following drawings are submitted with this utility patent application.

FIG. 3 is a cross section of the push plate within a measured scoop attachment.

FIG. 4 is a side view of the chopping push plate.

FIG. 5 is a top view of the chopping container attachment.

FIG. 6 is a top view of the mincing attachment.

FIG. 7 is a top view of the crushing attachment.

FIG. 8 is a top view of a shaped scoop attachment.

IV. DESCRIPTION OF THE PREFERRED EMBODIMENT

Figure 1:
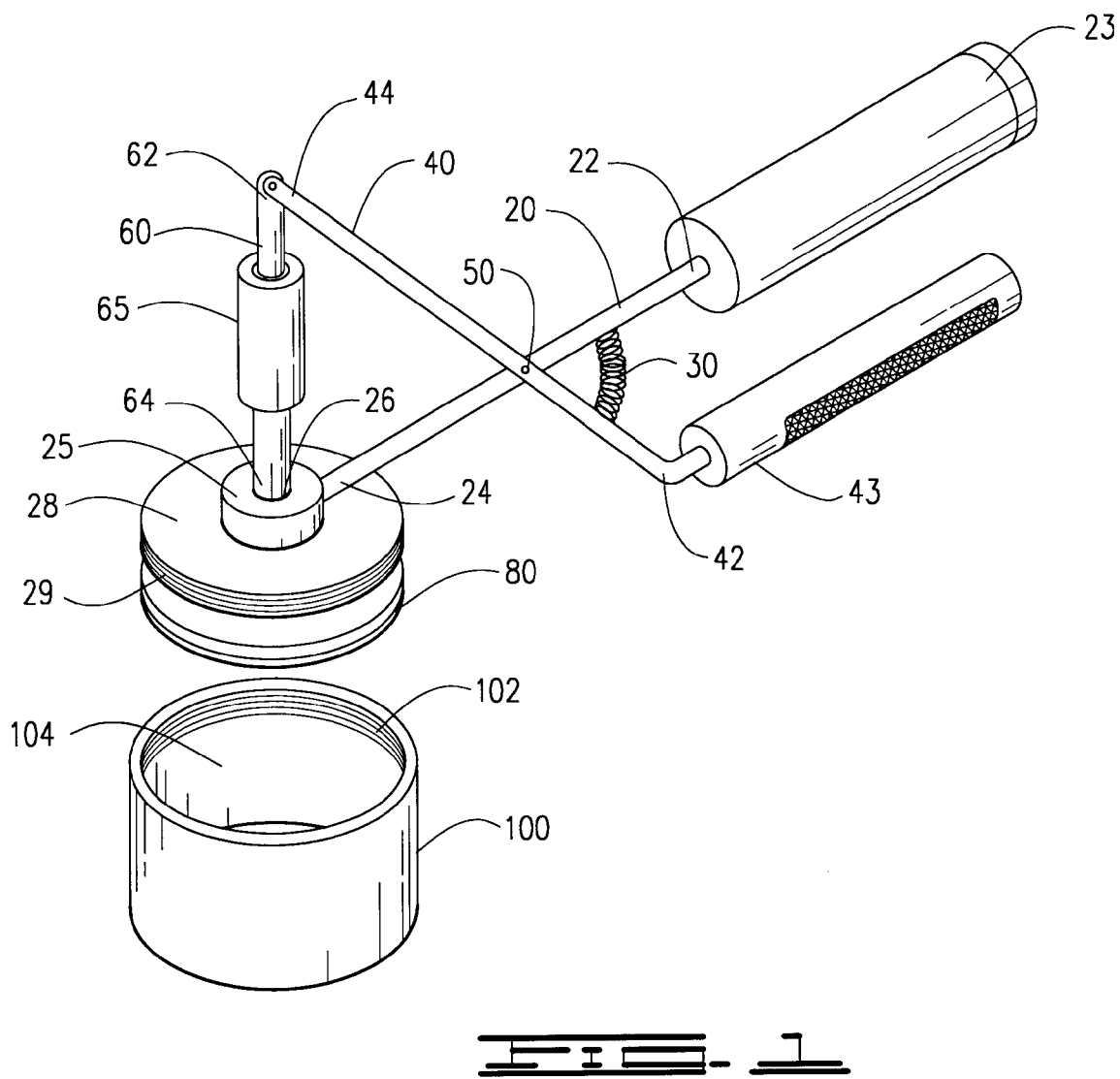
FIG. 1 is a perspective view of the Measured Utility Kitchen Scoop.
Figure 2:
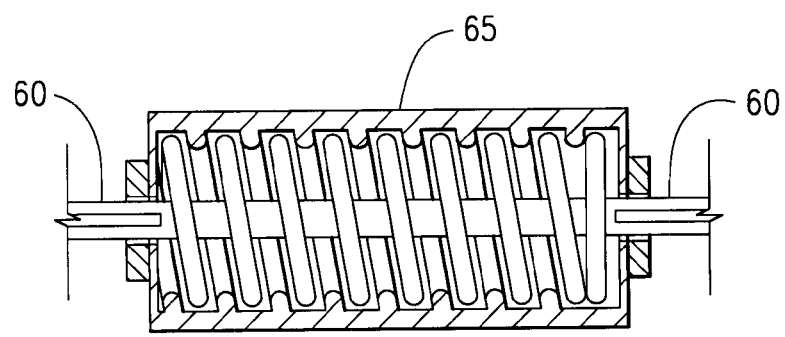
FIG. 2 is a cross section of the rotation sleeve.

A multiple function utility tool, FIGS. 1–8 of the drawings, for food preparation and kitchen use involves an adaptable scissor handle for single hand operation, the utility tool comprising a straight stationary lever arm 20 having a first end 22 with a base handle 23 and a second end 24 with a stationary guide ring 25 having a central opening 26 and a stationary mounting plate 28 having an outer threaded perimeter 29, a bent movable lever arm 40 having a first end 42 with a padded handle 43 and a second end 44 pivotally riveted to a first end 62 of a plunger arm 60, the plunger arm 60 having a selectable rotating means 65, FIG. 2, the plunger arm 60 also including a second end 64 having an internally threaded collar 68 to which is attached a push plate 80, the second end 64 of the plunger arm 60 further slidably engaging the central opening 26 of the stationary guide ring 25 of the stationary lever arm 20, a spring 30 urging the first end 22 of the stationary lever arm 20 from the first end 42 of the movable lever arm 40, a rivet 50 connecting the stationary lever arm 20 to the movable lever arm 40 in a scissor-like relationship, at least one shaped ring attachment 100 having an internal thread 102 adapted to engage the outer threaded perimeter 29 of the stationary mounting plate 28, the push plate 80 positioned to move within the shaped ring attachment 100 to evacuate any content from the shaped ring attachment 100 when the stationary lever arm 20 and the movable lever arm 40 are forced together.

The selectable rotating means 65, more specifically shown in an embodiment in FIG. 2, causes the plunger arm 60 to selectively exert either a straight force into the push plate 80, or to exert a twisting force to the push plate 80, depending on the use of the utility tool at the time. For example, in one embodiment, the push plate 80, instead of a flat push plate 80a shown in FIG. 3 of the drawings, may alternatively be provided as a chopping push plate 80b, having a plurality of chopping blades 85b extending from the chopping push plate 80b and the shaped ring attachment 100 may be provided as a closed canister 100a, shown in FIG. 5, providing the utility tool adapted for chopping of mincing nuts, vegetables or fruit. In this embodiment, the twisting force into the plunger arm 60 may be preferred. In other uses, a straight force on the plunger arm 60 may be desired, as would be the case if the flat push plate 80a, shown in FIG. 3 of the drawings were used with the shaped ring attachment 100 for pushing a food from the shaped ring attachment, FIG. 3, provided as a measured shaped ring attachment 100b, a cross-cut shaped ring attachment 100c, FIG. 6, an ornamental cookie shaped ring attachment 100e, FIG. 7, or a nut-cracking and core slicing shaped ring attachment 100d, FIG. 8.

Returning to the push plate 80 shown in FIGS. 1 and 3 of the drawings, the flat push plate 80a has an upper surface 82a having an externally threaded extension 84a threadably engaging the internally threaded collar 68 of the second end 64 of the plunger arm 60, allowing for it to be removed from the plunger arm 60 for cleaning or replacement. The chopping push plate 80b also has an upper surface 82b with an externally threaded extension 84b which may threadably engage the internally threaded collar 68 of the second end 64 of the plunger arm 60. The flat push plate 80a also includes a flat lower surface 86a and a smooth outer perimeter 88a adapted to engage inner walls 104 of the shaped ring attachment 100 for a complete evacuation of a food product from the shaped ring attachment 100. The chopping push plate 80b, FIG. 4, also has a lower surface 86b from which the plurality of chopping blades 85b extends and also has a smooth outer perimeter 88b adapted to engage the inner walls 104 of the shaped ring attachment 100.

In use, the spring between the stationary lever arm 20 and the movable lever arm 40 forces the respective first ends of the stationary lever arm 20 and movable lever arm 40 apart, with force required to bring the stationary lever arm 20 and moveable lever arm 40 together, pushing the plunger arm 60 through the central opening 26 on the stationary guide ring 25 of the stationary lever arm 20, in turn urging the push plate 80 away from the stationary mounting plate 28.

As indicated, there are several shaped ring attachments 100a–100e which may interchangeably be applied to the outer threaded perimeter 29 of the stationary mounting plate 28. This may include a plurality of measured shaped ring attachments 100b, singularly shown in FIG. 3, having outer rings 103b with volumes provided in common measured amounts of a quarter cup, half cup or a full cup, and metric measurements. The cross cut shaped ring attachment 100c, FIG. 6, includes an outer ring 103c with an opening 106c having a cross cut blade array 107c. The nut-cracking and core slicing shaped ring attachment 100d, FIG. 8, includes an outer ring 103d with an opening 106d having a multiple ring blade array 107d configured as indicated in the drawing, allowing for a nut to be placed on the blade array and then forced between the flat push plate 80a and the multiple ring blade array 107d for crushing, coring or slicing. The closed canister shaped ring attachment 100a of FIG. 5 includes an outer ring 103a and a full bottom plate 105a, said closed canister 100a maintaining the food product within the closed canister 100a during chopping or mincing, and then detached to hold the minced food product during transport to the food preparation location. The ornamental cookie shaped ring attachment 100e may be of any shape, but is shown for illustrative purposes in FIG. 7 as a star, the ornamental cookie shaped ring attachment 100e having an outer ring 103e, an upper plate 108e and an opening 106e, through which material may be scooped and forced into an ornamental shape between the flat push plate 80a, the upper plate 108e and the outer ring 103e.

Several other attachments substituting for the shaped ring attachment are contemplated but not shown, including a cheese slicer, a rotating grater attachment and even a cake decorating funnel. The scope of the attachments is not limited by the specific claims of the current invention disclosed herein. While the invention has been particularly shown and described with reference to a preferred embodiment thereof, it will be understood by those skilled in the art that changes in form and detail may be made therein without departing from the spirit and scope of the invention.

What is claimed is:

1. A multiple function utility tool for food preparation and kitchen use for single hand operation comprising:
    a straight stationary lever arm having a first end with a base handle and a second end with
    a stationary guide ring having a central opening and a stationary mounting plate having an outer threaded perimeter;
    a bent movable lever arm having a first end with a padded handle and a second end having a pivotal attaching hole to which is pivotally attached;
    a first end of a plunger arm, the plunger arm having a selectable rotating means, said plunger arm further including a second end having an internally threaded engagement slot to which is attached a push plate, the second end of the plunger arm further slidably engaging the central opening of the second end of the stationay lever arm;
    a spring urging the first end of the stationary lever arm from the first end of the movable lever arm, a rivet connecting the stationary lever arm to the movable lever arm; and
    at least one shaped ring attachment having an internal thread adapted to engage the outer threaded perimeter of the stationary mounting plate, the push plate positioned to move within the shaped ring attachment to evacuate any content from the shaped ring attachment when the stationary lever arm and the movable lever arm are forced together.

2. The utility tool, as disclosed in claim 1, further providing the selectable rotating means enabling the plunger arm to selectively exert either a straight force into the push plate, or to exert a twisting force to the push plate, depending on the use of the utility tool at the time.

3. The utility tool, as disclosed in FIG. 1, wherein the push plate comprises:
    a flat push plate; and
    a chopping push plate, having a plurality of blades extending from the chopping push plate, with the shaped ring attachment provided as a closed canister adapting the utility tool to chop or mince nuts, vegetables or fruit.

4. The utility tool as disclosed in claim 1, wherein the shaped ring attachment further comprises:
    a closed canister having an outer ring and a full bottom plate;
    a cross cut shaped ring attachment, having an outer ring and a cross cut blade array;
    a nut cracking and core slicing shaped ring attachment having an outer ring and a multiple ring blade array;
    a plurality of measured cylindrically shaped ring attachments having outer rings provided in common measured amounts of a quarter cup, half cup or a full cup, and even metric measurements; and
    and ornamental cookie shaped ring attachment.

\* \* \* \* \*